May 26, 1931.  C. H. H. RODANET  1,807,553
STEERING WHEEL
Filed Nov. 26, 1929
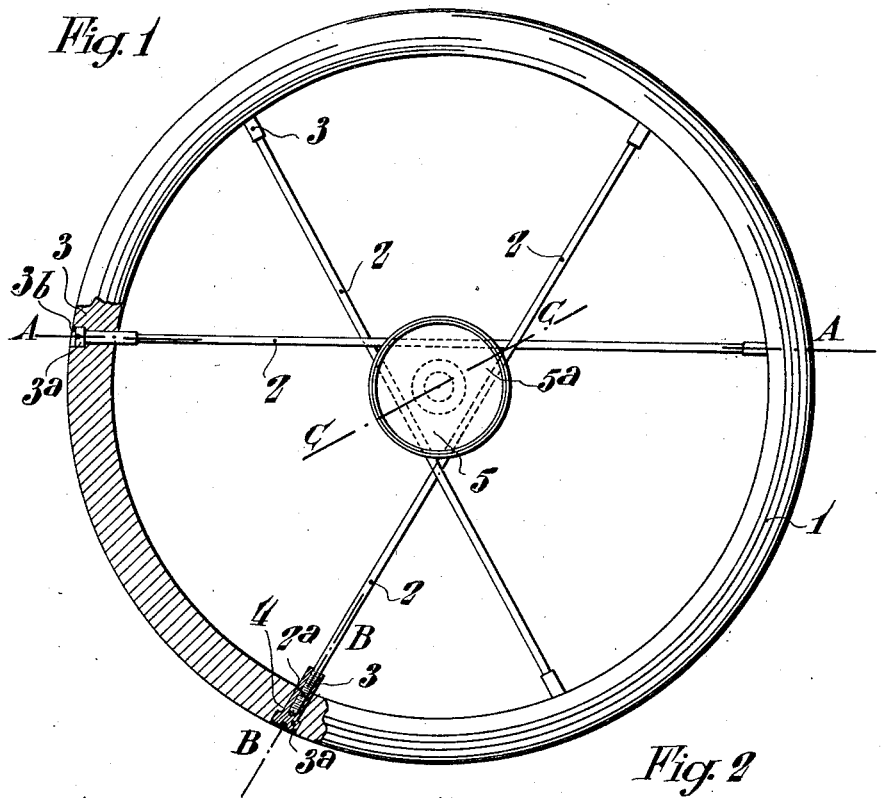
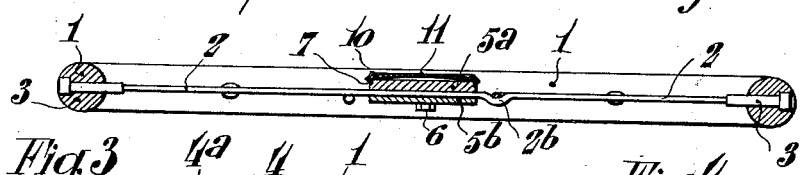
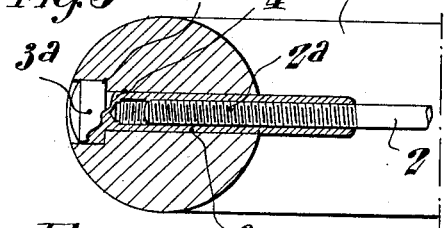
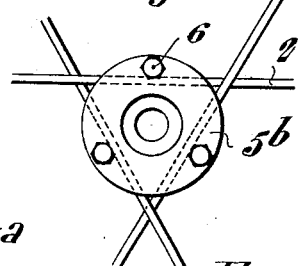
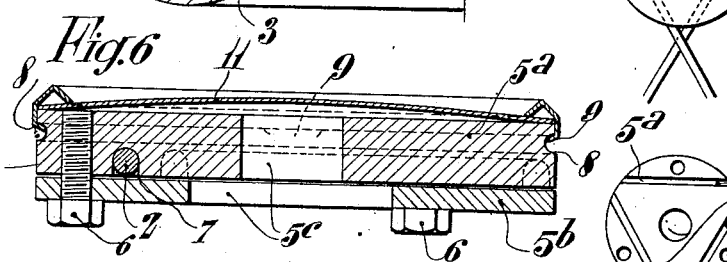
INVENTOR:
C. H. H. Rodanet Patented May 26, 1931

1,807,553

UNITED STATES PATENT OFFICE

CHARLES HENRI HILAIRE RODANET, OF VERSAILLES, FRANCE, ASSIGNOR TO SOCIÉTÉ ANONYME ETABLISSEMENTS ED. JAEGER, OF LEVALLOIS-PERRET, FRANCE

STEERING WHEEL

Application filed November 26, 1929, Serial No. 409,914, and in France December 22, 1928.

The present invention relates to improvements in steering hand-wheels and has for its objects:

(a) To provide a steering hand-wheel in which the arms or spokes are constituted by rods stretched between two points of the rim, so as to constitute chords of the annular part formed by this rim, these rods passing, at the central region, through a hub on the steering pillar, which hub can belong either to the said steering pillar, or to the steering wheel;

(b) To provide a steering hand-wheel in which the arms of spokes are constituted by rods arranged according to chords and which form, in the central region, a regular polygon, of convex or star shape, on which are secured cheeks forming a hub and provided with recesses for the said rods;

(c) To provide a steering hand-wheel the arms or spokes of which are constituted by rods arranged according to chords, the hub being formed by two cheeks secured on the said spokes, and in which it is possible to effect the assemblage as well as the tension of the metallic arms or rods, before mounting the steering wheel on its hub;

(d) To provide a steering hand-wheel the arms or spokes of which are constituted by equal chords which form, at their intersection, a regular polygon, which is moreover very accurate owing to the fact that this polygon has dimensions much smaller than those of the virtual polygon constituted by the heads of the spokes. An error, which is moreover always very slight, in the position of the holes perforated in the rim leads to an insignificant error in the regularity of the polygon formed by the intersection of the spokes. This polygon can therefore fit in a perfectly exact manner in the grooves provided on the hub with all the desired mechanical accuracy which can be obtained by a simple machining of this kind. An automatic centering, as perfect as possible, of the steering wheel on its hub is thus obtained.

The accompanying drawings illustrate, by way of example only, an improved steering wheel in accordance with the invention.

Figure 1 is a plan view partly broken away.

Figure 2 is a section made according to line A—A of the preceding figure.

Figure 3 is a section, on an enlarged scale, made according to line B—B of Fig. 1.

Figure 4 is an underside view of the hub.

Figure 5 is an underside of the upper cheek constituting one of the parts of the hub.

Figure 6 is a section, on an enlarged scale, made according to line C—C of Fig. 1.

The steering wheel illustrated is constituted by a rim 1 and arms 2, arranged according to equal chords of the circle formed by the rim. These arms 2 are constituted by rods which intersect in the central region, so as to form, in the example of construction described and illustrated, by way of example only, an equilateral triangle, the center of which mingles with that of the steering wheel.

The arms 2 are secured to the rim 1 through the medium of blind nuts 3, which are arranged in suitable recesses 4 provided in this rim. Each nut 4 bears on an annular seat $4^a$ of the corresponding recess 4, through the medium of a head $3^a$ provided with a saw cut $3^b$ ensuring the manipulation of the nut. The nuts 3 are screwed on the screw-threaded ends $2^a$ of the arms and allow, on the one hand, to hold these latter stationary on the rim and, on the other hand, to modify the tension of the said arms. The latter are distorted at $2^b$, as more particularly shown in Fig. 2, for ensuring the passage of the adjacent arm and allowing the arrangement of the said arms in one and the said plane. Moreover, these distortions prevent the arms 2 from rotating and facilitate, from this fact, the manipulation of the nuts 3.

An attached hub 5 is constituted, in the form of construction described and illustrated, by two crown-shaped cheeks $5^a$ and $5^b$, leaving consequently the central portion $5^c$ entirely free for the passage of any driving or central members. The cheek $5^b$ is rigidly secured on the steering pillar by any suitable means, and the cheek $5^a$ is removably attached on the cheek $5^b$ through the medium of screws 6 or of any equivalent means allowing the rapid removal of the upper cheek. The latter is provided with recesses 7 (Fig. 5) which are arranged according to the three sides of an equivalent triangle and in which fit the sides of the triangle constituted by the arms 2, the latter being held stationary in their recesses by the cheek 5$^b$ and the screws 6.

The side surface of the cheek 5$^a$ is provided with an annular groove 8 into which are bent back lugs 9 of an annular crown 10 for securing in position a small plate 11 arranged at the upper part of the cheek 5$^a$. This small plate, which is preferably decorative, can have means allowing to actuate sonorous or luminous devices.

What I claim as my invention and desire to secure by Letters Patent is:—

1. In a steering wheel, a circular rim, rods stretched rectilinearly in one and the same plane between two points of the said rim so as not to pass through the geometrical axis of the said rim, a hub formed by two members one of which has rectilinear recesses for the passage of the rods and means for securing the two members of the hub together.

2. In a steering wheel, a circular rim, rods stretched rectilinearly in one and the same plane between two points of the said rim for forming a regular polygon in the central region, a hub formed by two members one of which has rectilinear recesses for the passage of the rods and means for securing the two members of the hub together.

3. In a steering wheel, a circular rim, three rods stretched rectilinearly in one and the same plane between two points of the said rim for forming an equilateral triangle in the central region, a hub formed by two members one of which has rectilinear recesses for the passage of the rods and means for securing the two members of the hub together.

CHARLES HENRI HILAIRE RODANET.